United States Patent
Hwang (10) Patent No.: US 9,407,905 B2
(45) Date of Patent: Aug. 2, 2016

(54) STEREOSCOPIC IMAGE DISPLAY DEVICE, FRAME ALTERNATION DRIVING METHOD THEREOF, AND DATA DRIVING APPARATUS AND SHUTTER GLASSES FOR STEREOSCOPIC IMAGE DISPLAY DEVICE

(75) Inventor: Young-In Hwang, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 1072 days.

(21) Appl. No.: 13/137,972

(22) Filed: Sep. 22, 2011

(65) Prior Publication Data

US 2012/0113234 A1    May 10, 2012

(30) Foreign Application Priority Data

Nov. 5, 2010   (KR) .......................... 10-2010-0109834

(51) Int. Cl.
*H04N 13/04* (2006.01)

(52) U.S. Cl.
CPC ....... *H04N 13/0429* (2013.01); *H04N 13/0438* (2013.01); *H04N 13/0497* (2013.01)

(58) Field of Classification Search
None
See application file for complete search history.

(56) References Cited

U.S. PATENT DOCUMENTS

| | | | |
|---|---|---|---|
| 2009/0051759 A1* | 2/2009 | Adkins et al. | 348/53 |
| 2009/0237495 A1* | 9/2009 | Kawahara | 348/56 |
| 2010/0013911 A1* | 1/2010 | Jacobs et al. | 348/54 |
| 2011/0018983 A1* | 1/2011 | Kim et al. | 348/56 |
| 2011/0096146 A1* | 4/2011 | Hulyalkar et al. | 348/43 |
| 2011/0205346 A1 | 8/2011 | Taniguchi | |

FOREIGN PATENT DOCUMENTS

| | | |
|---|---|---|
| CN | 101222648 A | 7/2008 |
| CN | 101655625 A | 2/2010 |
| CN | 101697595 A | 4/2010 |
| CN | 101782687 A | 7/2010 |
| CN | 101848398 A | 9/2010 |
| JP | 08-043790 A | 2/1996 |
| JP | 2009031523 A | 2/2009 |
| JP | 2009-232249 A | 10/2009 |
| JP | 2010-087720 A | 4/2010 |
| JP | 2011-199841 A | 10/2011 |
| KR | 10 2006-0093610 A | 8/2006 |
| KR | 10 2008-0059937 A | 7/2008 |
| KR | 10 2008-0066504 A | 7/2008 |
| KR | 10 2010-0017725 A | 2/2010 |

* cited by examiner

*Primary Examiner* — Joseph Ustaris
*Assistant Examiner* — Edemio Navas, Jr.
(74) *Attorney, Agent, or Firm* — Lee & Morse, P.C.

(57) ABSTRACT

A stereoscopic image display device includes a display unit including a plurality of pixels and a data driver supplying first image data for a first view point to the plurality of pixels, second image data for a second view point to the plurality of pixels after supply of the first image data, third image data for the second view point to the plurality of pixels after supply of the second image data, and fourth image data for the first view point to the plurality of pixels after the input of the third image data. The stereoscopic image display device using such a time-division type scheme may decrease driving speed needed to display the stereoscopic image, may decrease reduction of luminance by reducing an amount of black data, and may decrease power consumption.

12 Claims, 8 Drawing Sheets

STEREOSCOPIC IMAGE DISPLAY DEVICE, FRAME ALTERNATION DRIVING METHOD THEREOF, AND DATA DRIVING APPARATUS AND SHUTTER GLASSES FOR STEREOSCOPIC IMAGE DISPLAY DEVICE

BACKGROUND

1. Field

Embodiments relate to a stereoscopic image display device, a driving method thereof, a data driving apparatus for a stereoscopic image display device, and shutter spectacles. More particularly, embodiments relate to a stereoscopic image display device capable of decreasing driving speed of a data driver and increasing luminance, a driving method thereof, a data driving apparatus for a stereoscopic image display device, and shutter spectacles.

2. Description of the Related Art

A stereoscopic image display device realizes a 3D stereoscopic effect from a 2D image by using binocular disparity in which a disparity of both eyes is increased if an observer is close to an object, and the disparity of both eyes is decreased if the observer is far from the object. For example, if left and right images on a screen are adjusted to correspond to each other, it is perceived that the object is disposed on the screen, however if the left-eye image is disposed on the left side and the right-eye image is disposed on the right side, it is perceived that the object is disposed behind the screen, and if the left-eye image is disposed on the right side and the right-eye image is disposed on the left side, it is perceived that the object is disposed in front of the screen. Here, depth perception of the object is determined by an interval between the right and left images that are disposed on the screen.

A well-known method to display the stereoscopic image is a method of dividing and selecting a left-eye image and a right-eye image that are displayed with a red color and a blue color by color spectacles using color filters that have a relationship of complementary colors. Also, there is a method in which the left-eye image and the right-eye image are displayed through different polarization, and they are divided and selected by polarizing spectacles. The method using the color spectacles has a drawback that the object is not displayed with a natural color, and the method using the polarizing spectacles has the drawback that the left-eye image is recognized through the right eye or the right-eye image is recognized through the left eye according to the polarization capacity such that the stereoscopic effect is deteriorated.

The above information disclosed in this Background section is only for enhancement of understanding of the background of the invention and therefore it may contain information that does not form the prior art that is already known in this country to a person of ordinary skill in the art.

SUMMARY

Embodiments provide a stereoscopic image display device capable of decreasing driving speed of a stereoscopic image display device of a time-division type using shutter spectacles and increasing luminance, a driving method thereof, a data driving apparatus for a stereoscopic image display device, and shutter spectacles.

A stereoscopic image display device according to an exemplary embodiment includes: a display unit including a plurality of pixels; and a data driver inputting first image data for a first view point to a plurality of pixels and second image data for a second view point to a plurality of pixels after the input of the first image data, third image data for the second view point to a plurality of pixels after the input of the second image data, and fourth image data for the first view point to a plurality of pixels after the input of the third image data.

The first image data and the second image data may be image data to display one frame of the stereoscopic image, and the third image data and the fourth image data may be image data to display one frame of a following stereoscopic image.

The data driver may input black data to a plurality of pixels after the input of the first image data and before the input of the second image data.

The data driver may input black data to a plurality of pixels after the input of the third image data and before the input of the fourth image data.

The first stereoscopic image of one frame may be displayed according to the first image data and the second image data, and the second stereoscopic image of one frame following the first stereoscopic image is displayed according to the third image data and the fourth image data.

The plurality of pixels may be arranged in a matrix format of the display unit, and the first image data, the second image data, the third image data, the fourth image data, and the black data may be sequentially input to the plurality of pixels.

A method for driving a stereoscopic image display device according to another exemplary embodiment of the present invention includes: displaying a first image for a first view point to a display unit; displaying a second image for a second view point to the display unit after displaying the first image; displaying a third image for the second view point to the display unit after displaying the second image; and displaying a fourth image for the first view point to the display unit after displaying the third image.

The display unit may include a plurality of pixels arranged in a matrix format, and the data for the display of the image is sequentially input to a plurality of pixels.

Black data may be input to a plurality of pixels after the first image data for the display of the first image is input to the plurality of pixels before the second image data for the display of the second image is input to the plurality of pixels.

Black data may be input to a plurality of pixels after the third image data for the display of the third image is input to the plurality of pixels before the fourth image data for the display of the fourth image is input to the plurality of pixels.

The first image data and the second image data may be image data to display one frame of the stereoscopic image, and the third image data and the fourth image data may be image data to display one frame of a following stereoscopic image.

A data driving apparatus driving a display unit including a plurality of pixels according to another exemplary embodiment of the present invention includes: a first data driver outputting first image data for a first view point to a plurality of pixels, and second image data for the first view point after the output of the first image data; and a second data driver outputting third image data for the second view point to a plurality of pixels after the output of the second image data, and fourth image data for the second view point after the output of the third image data.

A black data driver outputting black data to a plurality of pixels after the second image data is output before the third image data is output may be further included.

Second image data and third image data that may be divided by the black data are image data to display one frame of the stereoscopic image.

Shutter spectacles according to another exemplary embodiment of the present invention include: a first shutter opened/closed for an image for a first view point displayed in a stereoscopic image display device to be visualized; a second shutter opened/closed for an image for a second view point displayed in a stereoscopic image display device to be visualized; and a shutter driver driving the first shutter and the second shutter in synchronization with the stereoscopic image display device.

DETAILED DESCRIPTION

This application claims priority to and the benefit of Korean Patent Application No. 10-2010-0109834 filed in the Korean Intellectual Property Office on Nov. 5, 2010, the entire contents of which are incorporated herein by reference.

Hereinafter, some exemplary embodiments are described in detail with reference to the accompanying drawings in order for those skilled in the art to be able to readily practice the exemplary embodiments. As those skilled in the art would realize, the described embodiments may be modified in various different ways, all without departing from the spirit or scope of the present invention.

Furthermore, in some exemplary embodiments, constituent elements having the same construction are assigned the same reference numerals and are described in connection with a first exemplary embodiment as a representative example. In the remaining exemplary embodiments, only constituent elements different from those of the first exemplary embodiment are described.

In order to clarify a description of the present invention, parts not related to the description are omitted, and the same reference numbers are used throughout the drawings to refer to the same or like parts.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

A stereoscopic image display device according to the present invention may be realized as various flat panel displays such as a liquid crystal display (LCD), a field emission display (FED), a plasma display panel (PDP), and an organic light emitting diode (OLED) display. Hereafter, for better understanding and ease of description, the organic light emitting diode (OLED) display is described as one example, however the stereoscopic image display device according to the present invention is not limited thereto.

Figure 1:
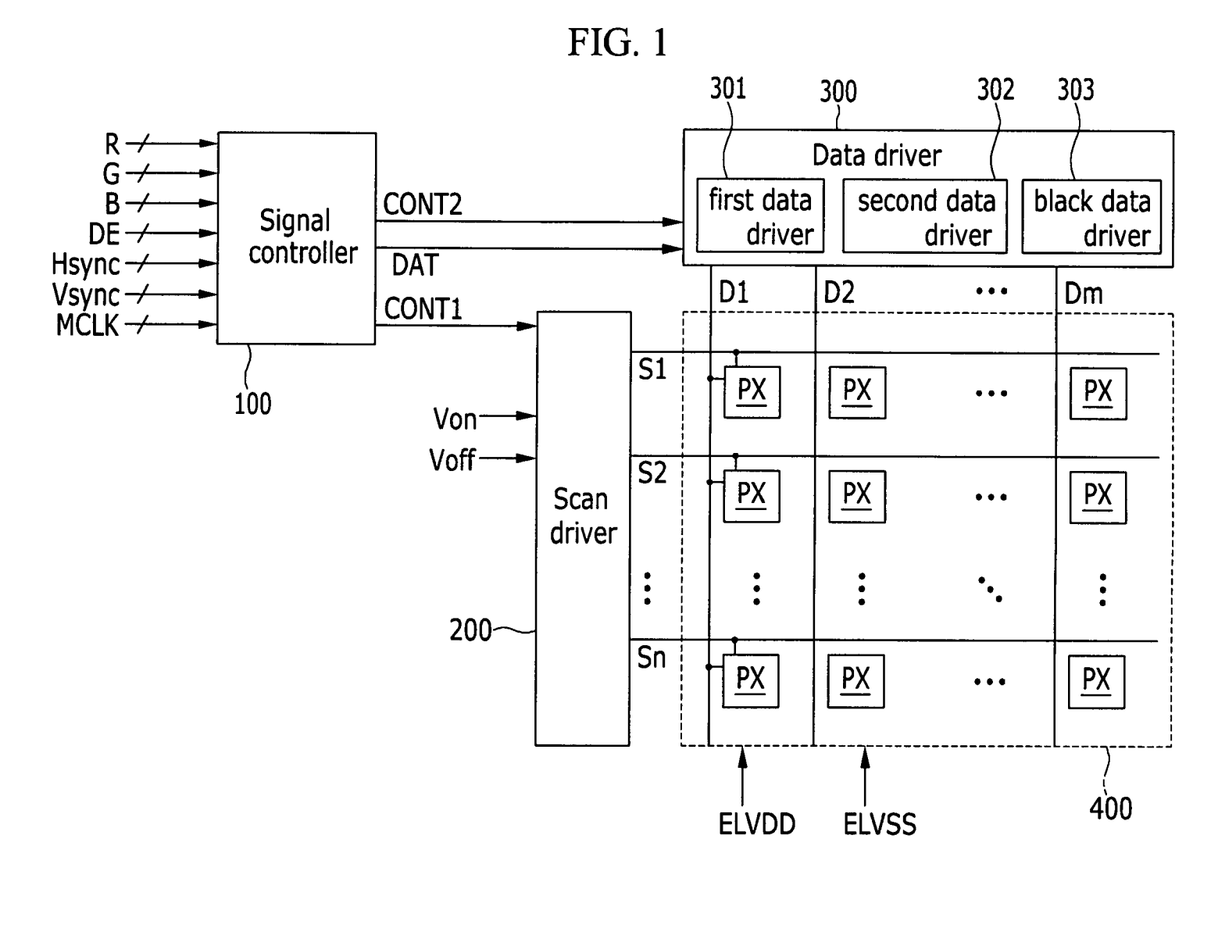
FIG. 1 is a block diagram of a stereoscopic image display device according to an exemplary embodiment.

FIG. 1 is a block diagram of a stereoscopic image display device according to an exemplary embodiment of the present invention. Referring to FIG. 1, a stereoscopic image display device includes a display unit 400, a scan driver 200, a data driver 300, and a signal controller 100 controlling the drivers 200 and 300.

The signal controller 100 receives video signals R, G, and B from an external device and an input control signal that controls displaying thereof. The video signals R, G, and B include luminance of each pixel PX, and the luminance has a grayscale having a predetermined number, for example, $1024=2^{10}$, $256=2^8$, or $64=2^6$. Examples of the input control signal include a vertical synchronization signal Vsync, a horizontal synchronization signal Hsync, a main clock signal MCLK, and a data enable signal DE.

The signal controller 100 appropriately processes the input video signals R, G, and B according to the operation condition of the display unit 400 and the data driver 300 on the basis of the input video signals R, G, and B and the input control signal, and generates a scan control signal CONT1, a data control signal CONT2, and an image data signal DAT. The signal controller 100 transmits the scan control signal CONT1 to the scan driver 200. The signal controller 100 transmits the data control signal CONT2 and the image data signal DAT to the data driver 300. The image data signal DAT includes a left eye image data signal and a right eye image data signal.

The display unit 400 includes a plurality of scan lines S1-Sn, a plurality of data lines D1-Dm, and a plurality of pixels PX connected to the plurality of signal lines S1-Sn and D1-Dm and arranged in an approximate matrix form. The plurality of scan lines S1-Sn are extended in a row direction and are in parallel with each other, and the plurality of data lines D1-Dm are extended in a column direction and are in parallel with each other. The plurality of scan lines S1-Sn are connected to the scan driver 200, and the plurality of data lines D1-Dm are connected to the data driver 300. The plurality of pixels PX of the display unit 400 receive a first power source voltage ELVDD and a second power source voltage ELVSS from the outside.

The scan driver 200 is connected to the plurality of scan lines S1-Sn, and applies scan signals that include a combination of a gate-on voltage Von that turns on the switching transistor (referring to M1 of FIG. 2) and a gate-off voltage Voff that turns it off to the plurality of scan lines S1-Sn according to the scan control signal CONT1. The scan driver 200 applies the scan signal to the plurality of scan lines S1-Sn such that the data signal is applied to the plurality of pixels PX.

The data driver 300 is connected to the plurality of data lines D1-Dm, and selects a data voltage according to the image data signal DAT. The data driver 300 applies the selected data voltage as the data signal to the plurality of data lines D1-Dm according to the data control signal CONT2. The data signal includes a left eye image data to display the left-eye image and a right eye image data to display the right-eye image. The data driver 300 applies the left eye image data to display the left-eye image and the right eye image data to display the right-eye image to the plurality of data lines D1-Dm as a frame unit alternation type. The frame unit alternation type will be described later.

The above-described drivers 100, 200, and 300 can be directly installed as integrated circuit chips on the display unit 400, can be installed on a flexible printed circuit film (not shown), can be adhered as a tape carrier package (TCP) to the display unit 400, or can be installed on an additional printed circuit board (not shown). Further, the driversa 100, 200, and 300 can be integrated on the display unit 400 together with the signal lines S1-Sn and D1-Dm.

Figure 2:
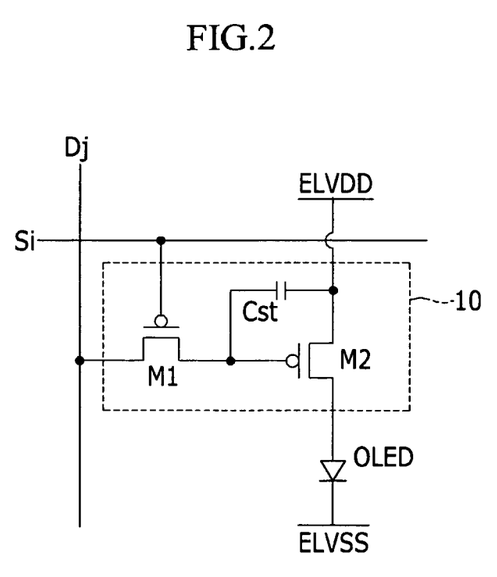
FIG. 2 is a circuit diagram showing a pixel according to an exemplary embodiment.

FIG. 2 is a circuit diagram showing a pixel according to an exemplary embodiment. Referring to FIG. 2, a pixel PX of the organic light emitting diode (OLED) display includes an organic light emitting diode (OLED) and a pixel circuit 10 to control the organic light emitting diode (OLED). The pixel circuit 10 includes a switching transistor M1, a driving transistor M2, and a sustain capacitor Cst.

Here, the pixel circuit 10 includes two transistors and one capacitor, however the pixel circuit of the organic light emitting diode (OLED) display may be various configured and operated, and the stereoscopic image display device according to embodiments is not limited to the particular configuration of the pixel circuit.

The switching transistor M1 includes a gate electrode connected to the scan line S1, a first terminal connected to the data line Dj, and a second terminal connected to the gate electrode of the driving transistor M2.

The driving transistor M2 includes a gate electrode connected to the second terminal of the switching transistor M1, a first terminal connected to the first power source ELVDD, and a second terminal connected to the anode of the organic light emitting diode OLED.

The sustain capacitor Cst includes a first terminal connected to the gate electrode of the driving transistor M2 and a second terminal connected to one terminal of the driving transistor M2. The sustain capacitor Cst charges the data voltage applied to the gate electrode of the driving transistor M2 and maintains it after the switching transistor M1 is turned off.

The organic light emitting diode (OLED) includes an anode connected to the second terminal of the driving transistor M2 and a cathode connected to the second power source ELVSS.

The switching transistor M1 and the driving transistor M2 may be p-channel field effect transistors. Here, the gate-on voltage turning on the switching transistor M1 and the driving transistor M2 is a logic low level voltage, and the gate off voltage turning them off is a logic high level voltage.

Here, the switching transistor M1 and the driving transistor M2 are the p-channel field effect transistors, however at least one of the switching transistor M1 and the driving transistor M2 may be an n-channel field effect transistor, and the gate-on voltage for turning on the n-channel electric field effect transistor is the logic high voltage, and the gate-off voltage for turning it off is the logic low voltage.

When the gate-on voltage Von is applied to the scan line S1, the switching transistor M1 is turned on, and a data signal applied to the data line Dj is applied to one terminal of the storage capacitor Cst through the turned on switching transistor M1 to charge the sustain capacitor Cst. The driving transistor M2 controls the amount of current flowing from the ELVDD power source to the organic light emitting diode OLED corresponding to a voltage value charged in the storage capacitor Cst. The current flowing through the driving transistor M2 from the first power source ELVDD flows to the organic light emitting diode OLED. The organic light emitting diode OLED generates light corresponding to the amount of current flowing through the driving transistor M2.

The organic light emitting diode OLED may emit light of one of primary colors. The primary colors include, for example, three primary colors of red, green, and blue, and a desired color is displayed with a spatial or temporal sum of the three primary colors. In this case, the organic light emitting diode (OLED) may partially emit white light, and accordingly luminance is increased. Alternatively, the organic light emitting diodes (OLEDs) of all pixels PX may emit white light, and some of the pixels PX may further include a color filter (not shown) that changes white light emitted from the organic light emitting diodes (OLEDs) to light of one of the primary colors.

In the stereoscopic image display device, a process that one of the left eye image data, the right eye image data, and black data is input to a plurality of pixels included in the display unit 400 is performed as follows.

The scan driver 200 sequentially applies the scan signal of the gate-on voltage to a plurality of scan lines S1-Sn according to the scan control signal CONT1 transmitted from the signal controller 100. The scan signal of the gate-on voltage turns on the switching transistor M1. Here, the data driver 300 applies the data signal (one of the left eye image data, the right eye image data, and the black data) to a plurality of pixels connected to the scan line applied with the gate-on voltage. The data signal flows to the one terminal of the storage capacitor Cst through the turned on switching transistor M1 to charge the storage capacitor Cst. The driving transistor M2 controls the amount of current flowing from the ELVDD power source to the organic light emitting diode OLED corresponding to a voltage value charged in the storage capacitor Cst. The organic light emitting diode OLED generates light corresponding to the amount of current flowing through the driving transistor M2.

By this method, the data signal (one of the left eye image data, the right eye image data, and the black data) is sequentially input to the plurality of pixels connected to the n-th scan line Sn from the first scan line S1.

Now, a driving operation of a stereoscopic image display device of a time-division type using the shutter spectacles will be described.

One frame is a unit dividing the images displayed in the stereoscopic image display device. To display the stereoscopic image, the left-eye image and the right-eye image must be divided temporally or spatially.

In an exemplary embodiment, the left-eye image and the right-eye image are temporally divided to display the stereoscopic image. A type in which the right-eye image is temporally divided to display the stereoscopic image is referred to as the time-division type. In the time-division type, one frame of the stereoscopic image means a unit image of the stereoscopic image in which the left-eye image and the right-eye image are temporally divided and displayed on the whole screen. The left-eye image and the right-eye image that correspond under one frame are recognized as the stereoscopic image to a viewer.

Figure 3:
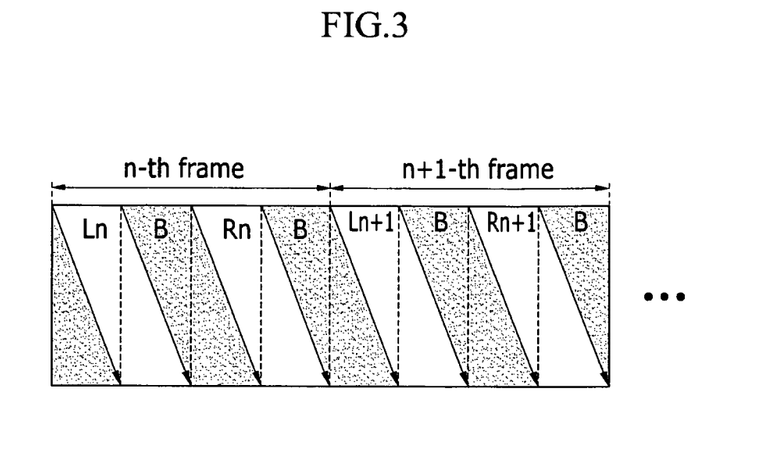
FIG. 3 is a view showing an example of a driving operation of a stereoscopic image display device of an image unit alternation type.

FIG. 3 is a view showing an example of a driving operation of a stereoscopic image display device of an image unit alternation type.

Referring to FIG. 3, a right and left image display type in the stereoscopic image display device of a time-division type using the shutter spectacles includes an image unit alternation type. The image unit alternation type is a type that alternately displays the left-eye image and the right-eye image. Here, the black data to divide the right and left images is input to the plurality of pixels between the left eye image data and the right eye image data and between the right eye image data and the left eye image data. The left-eye image is recognized by the right eye and the right-eye image is recognized by the left eye such that deterioration of the stereoscopic effect may be generated, but the black data is input to prevent this deterioration.

For example, as shown, the left eye image data Ln is sequentially input to a plurality of pixels in the n-th frame and the black data B is input to the plurality of pixels. After the black data B is input, the right eye image data Rn is sequentially input to a plurality of pixels at a view point that does not overlap the left eye image data Ln. After the right eye image data Rn is input, the black data B is input. That is, in the n-th frame, the left eye image data Ln, the black data B, the right eye image data Rn, and the black data B are sequentially input to a plurality of pixels. In the (n+1)-th frame, the left eye image data Ln+1, the black data B, the right eye image data Rn+1, and the black data B are sequentially input to a plurality of pixels in the same sequence as the n-th frame.

In other words, the image unit alternation type is the type in which the image for the first view point and the image for the second view point are alternately displayed in the same sequence in all frames.

Hereafter, the first view point indicates one of left eye and right eye, and the second view point indicates the other. The image for the first view point is referred to as the first view point image, and the image for the second view point is referred to as the second view point image. The data for the first view point is referred to as the first view point data, and the data for the second view point is referred to as the second view point data.

In the image unit alternation type, four data inputs are performed in the sequence of the first view point image data, black data, the second view point image data, and the black data in one frame to display one stereoscopic image. Accordingly, the stereoscopic image display device must supply the data to a plurality of pixels with a faster, e.g., four times faster, driving speed than the 2D display device. For example, the image that is displayed at 60 Hz in the 2D display device must be displayed at 240 Hz in the stereoscopic image display device. Also, the stereoscopic image display device may have half the luminance of the image compared with the 2D display device due to the insertion of the black data. To compensate this, the stereoscopic image display device must output the image with two times the luminance. Accordingly, power consumption amount may be increased.

Next, the proposed frame unit alternation type will be described.

Figure 4:
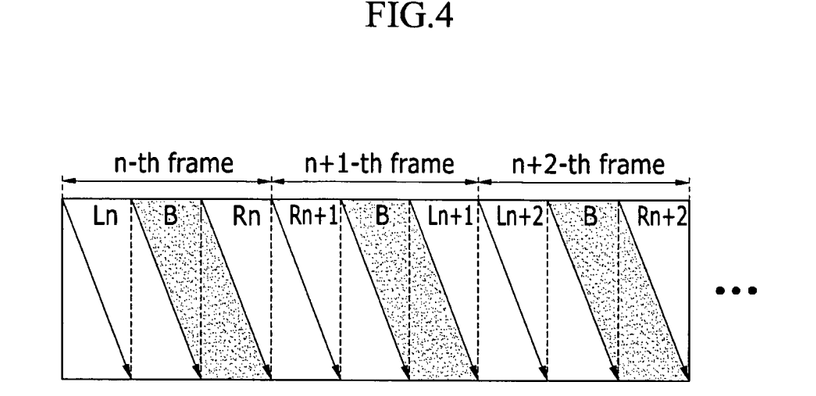
FIG. 4 is a view showing a driving operation of a stereoscopic image display device of a frame unit alternation type according to an exemplary embodiment.
Figure 5:
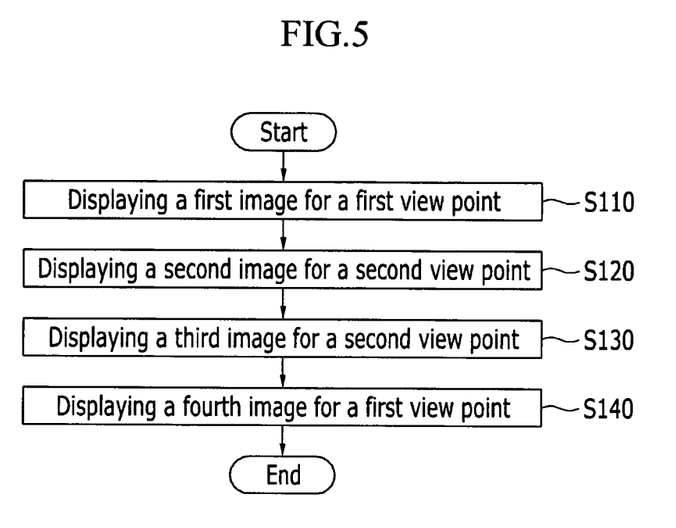
FIG. 5 is a flowchart showing a driving method of a stereoscopic image display device of a frame unit alternation type according to an exemplary embodiment.

FIG. 4 is a view showing a driving operation of a stereoscopic image display device of a frame unit alternation type according to an exemplary embodiment of the present invention. FIG. 5 is a flowchart showing a driving method of a stereoscopic image display device of a frame unit alternation type according to an exemplary embodiment of the present invention.

Referring to FIGS. 4 and 5, the right/left image display method includes the frame unit alternation type in the stereoscopic image display device of a time-division type using the shutter spectacles. The frame unit alternation type is one in which the first view point image and the second view point image that correspond to each other are alternately displayed, and the sequence of the first view point image and the second view point image is changed by the frame unit.

The stereoscopic image display device displays the first image for the first view point to the display unit 400 (S110). That is, the first image data for the first view point is sequentially input to a plurality of pixels included in the display unit 400 to display the first image.

After displaying the first image, the stereoscopic image display device displays the second image for the second view point to the display unit 400 (S120). That is, the second image data for the second view point is sequentially input to a plurality of pixels included in the display unit 400 to display the second image. For the display of the stereoscopic image, as the first image as the image corresponds to the second image, the user recognizes one stereoscopic image by the first image and the second image. That is, the first image data and the second image data are the image data display of one frame of the stereoscopic image.

After the first image data is input, the black data is input to a plurality of pixels before the second image data is input. The black data may be sequentially input to a plurality of pixels.

After displaying the second image, the stereoscopic image display device displays the third image for the second view point to the display unit 400 (S130). That is, the third image data for the second view point is sequentially input to a plurality of pixels included in the display unit 400 to display the third image.

After displaying the third image, the stereoscopic image display device displays the fourth image for the first view point to the display unit 400 (S140). That is, the fourth image data for the first view point is sequentially input to a plurality of pixels included in the display unit 400 to display the fourth image. To display the stereoscopic image, as the third image as the image corresponds to the fourth image, the user recognizes the other stereoscopic image by the third image and the fourth image. That is, the third image data and the fourth image data are the image data to display one frame of the stereoscopic image by the first image data and the second image data and one frame of the other stereoscopic image.

After the third image data is input, the black data is input to a plurality of pixels before the fourth image data is input.

As described above, the stereoscopic image display device according to the frame unit alternation type sequentially inputs the first view point image data, black data, and the second view point image data with the sequence thereof in the n-th frame to a plurality of pixels, and sequentially inputs the second view point image data, black data, and the first view point image data with the sequence thereof in the (n+1)-th frame to a plurality of pixels.

For example, as shown in FIG. 4, the black data B is input after the left eye image data Ln is input to a plurality of pixels in the n-th frame, and the right eye image data Rn corresponding to the left eye image data Ln is input after the black data B is input. Also, in the (n+1)-th frame, the black data B is input after the right eye image data Rn+1 is input to a plurality of pixels, and the left eye image data Ln+1 corresponding to the right eye image data Rn+1 is input after the black data B is input. In the (n+2)-th frame, the black data B is input after the left eye image data Ln+2 is input to a plurality of pixels, and the right eye image data Rn+2 corresponding to the left eye image data Ln+2 is input after the black data B is input.

The black data is input one by one between the left eye image data and the right eye image data that correspond to each other in each frame for the stereoscopic image display. After the right eye image data Rn is input to a plurality of pixels in the n-th frame, the right eye image data Rn+1 is input to a plurality of pixels in the (n+1)-th frame, such that there is no right/left image requiring black data there between. Also, after the left eye image data Ln+1 is input to a plurality of pixels in the (n+1)-th frame, the left eye image data Ln+2 is input to a plurality of pixels in the (n+2)-th frame such that there is no left/right image requiring black data there between. That is, the image data of the same view point is input to a plurality of pixels between the frames, the black data is not needed there between. Accordingly, each frame includes three data inputs, i.e., the first view point image data, the black data, and the second view point image data, to display the stereoscopic image.

The data driver 300 supplying the left eye image data and the right eye image data to a plurality of pixels included in the display unit 400 with the frame unit alternation type may include a first data driver 301 supplying data for the first view point, a second data driver 302 supplying data for the second view point, and a black data driver 303 supplying black data between outputs of the first data driver 301 and the second data driver 302.

The first data driver 301 outputs the first image data for the first view point to a plurality of pixels, and outputs the second image data for the first view point after the output of the first image data. The second data driver 302 outputs the third image data for the second view point to a plurality of pixels after the second image data is output in the first data driver 301, and outputs the fourth image data for the second view point after the output of the third image data. The black data driver 303 outputs the black data to a plurality of pixels after the second image data is output in the first data driver 301 before the third data is output in the second data driver 302. The image data to display one frame of the stereoscopic image is the second image data and the third image data that are divided by the black data.

Figure 6:
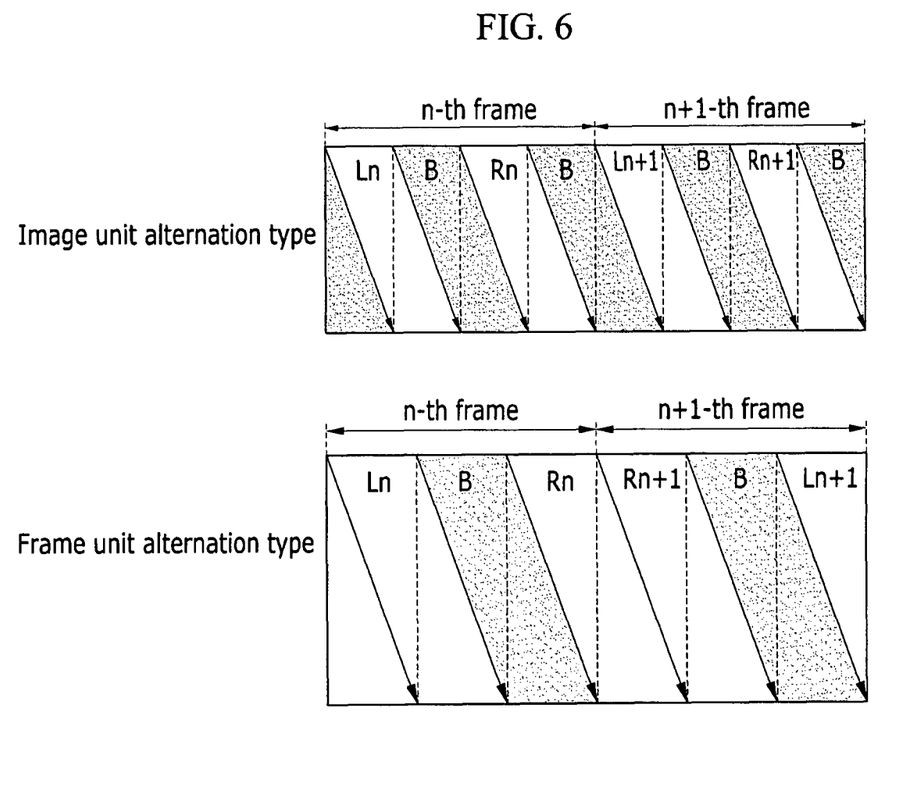
FIG. 6 is a view comparing a frame unit alternation type and an image unit alternation type according to an exemplary embodiment.

FIG. 6 is a view comparing an image unit alternation type and a frame unit alternation type according to an exemplary embodiment of the present invention.

Referring to FIG. 6, the left eye image data, the right eye image data, and two black data are input to a plurality of pixels in the image unit alternation type during one frame. In the frame unit alternation type, the left eye image data, the right eye image data, and one black data are input to a plurality of pixels during one frame.

The stereoscopic image display device driven by the image unit alternation type performs four data inputs during one frame. In contrast, the stereoscopic image display device driven by the frame unit alternation type performs three data inputs during one frame.

Accordingly, the stereoscopic image display device driven by the frame unit alternation type may decrease the driving speed of inputting the data to a plurality of pixels compared with the stereoscopic image display device driven by the image unit alternation type. For example, while the image that is displayed at 60 Hz in the 2D display device is displayed at 240 Hz in the stereoscopic image display device driven by the image unit alternation type, the image may be displayed at 180 Hz in the stereoscopic image display device driven by the frame unit alternation type.

Also, black data is displayed twice within one frame by the stereoscopic image display device driven by the image unit alternation type, decreasing luminance by half. In contrast, black data is displayed only once within a frame by the stereoscopic image display device driven by the frame unit alternation type, such that the luminance is decreased by ⅓. That is, the stereoscopic image display device driven by the frame unit alternation type may reduce the decrease of the luminance compared with the stereoscopic image display device driven by the image unit alternation type. The decrease of the luminance is reduced such that the stereoscopic image display device driven by the frame unit alternation type may reduce the output of the image for the compensation of the decreasing of the luminance compared with the stereoscopic image display device driven by the image unit alternation type, and thereby the power consumption may be reduced.

Figure 7:
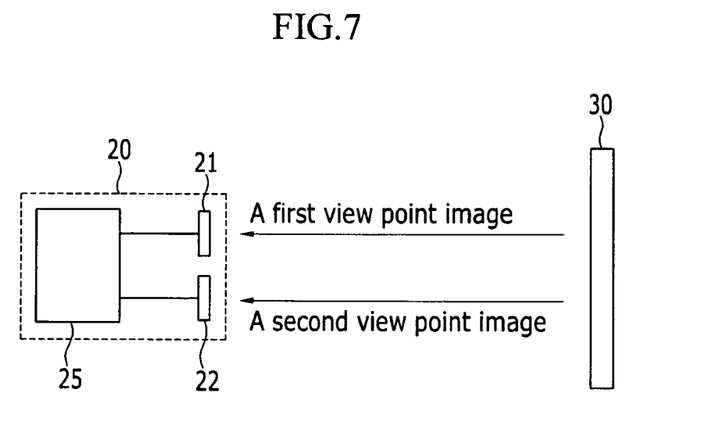
FIG. 7 is a block diagram schematically showing shutter spectacles for a stereoscopic image display device according to an exemplary embodiment.
Figure 8:
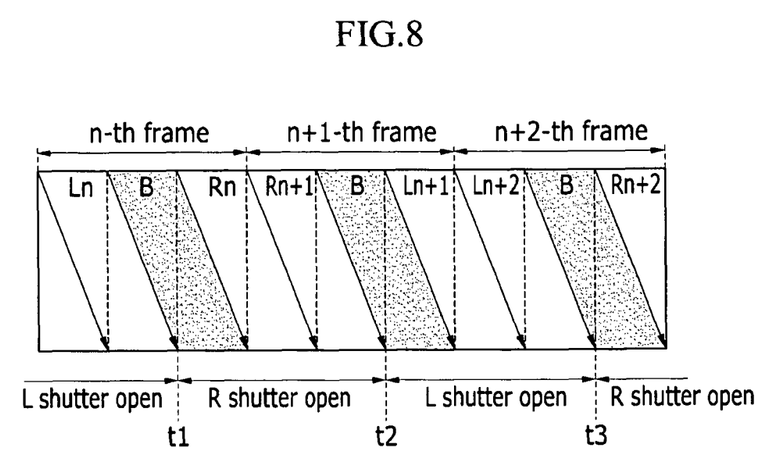
FIG. 8 is a view showing an operation of shutter spectacles for a stereoscopic image display device according to an exemplary embodiment.

FIG. 7 is a block diagram schematically showing shutter spectacles for a stereoscopic image display device according to an exemplary embodiment of the present invention. FIG. 8 is a view showing an operation of shutter spectacles for a stereoscopic image display device according to an exemplary embodiment of the present invention.

Referring to FIGS. 7 and 8, the stereoscopic image display device 30 displays the first view point image and the second view point image through the time-division type, and transmits a synchronization signal indicating the time of the display of the first view point image and the second view point image to shutter spectacles 20. The shutter spectacles 20 receive the synchronization signal from the stereoscopic image display device 30, and visualize the first view point image to the first view point of the user and the second view point image to the second view point of the user according to the synchronization signal.

For this, the shutter spectacles 20 includes a first shutter 21 that is opened and closed for the first view point image displayed in the stereoscopic image display device 30 to be visualized, a second shutter 22 that is opened and closed for the second view point image to be visualized, and a shutter driver 25 synchronized to the stereoscopic image display device 30 to drive the first shutter 21 and the second shutter 22. The shutter driver 25 transmits the opening/closing signal alternately opening and closing the first shutter 21 and the second shutter 22 to the first shutter 21 and the second shutter 22 according to the synchronization signal, and the first shutter 21 and the second shutter 22 are alternately opened and closed according to the opening/closing signal.

It is assumed that the first view point image and the second view point image are displayed by the frame unit alternation type in the stereoscopic image display device 30, and that the synchronization signal indicating the display is transmitted to the shutter spectacles 20. According to the frame unit alternation type, the shutter driver 25 opens the first shutter 21 for the first image for the first view point to be visualized, and then opens the second shutter 22 for the second image for the second view point to be visualized after the first image is opened. Also, the shutter driver 25 opens the second shutter 22 for the third image for the second view point to be visualized after the second image is visualized, and opens the first shutter 21 for the fourth image for the first view point to be visualized after the third image is visualized.

For example, as shown in FIG. 8, the left shutter L through which the left-eye image Ln is displayed is opened to the view point t1 in the n-th frame. The right shutter R is opened when the right-eye image Rn is displayed after the view point t1 and is opened to the view point t2 in which the right-eye image Rn+1 is continuously displayed in the (n+1)-th frame. The left shutter L is opened when the left-eye image Ln+1 is displayed in the (n+1)-th frame after the view point t2, and is opened to the view point t3 in which the left-eye image Ln+2 that is continuously displayed in the (n+2)-th frame is displayed.

In the case of the shutter spectacles opening both shutters in synchronization to the stereoscopic image display device driven by the image unit alternation type, both shutters must be opened one time per one frame. However, the shutter spectacles 20 alternately opening the first shutter 21 and the second shutter 22 in synchronization to the stereoscopic image display device driven by the frame unit alternation type opens/closes one of the first shutter 21 and the second shutter 22 per one frame.

That is, the shutter spectacles 20 of the stereoscopic image display device driven by the frame unit alternation type may decrease the driving speed needed for opening/closing of the shutter compared with the stereoscopic image display device driven by the image unit alternation type.

By way of summation and review, the stereoscopic image display device using a time-division type scheme according to embodiments may decrease driving speed needed to display the stereoscopic image, may decrease reduction of luminance by reducing an amount of black data, and may decrease power consumption. Further, use of a time-division type scheme according to embodiments may decrease driving speed needed to open/close shutters in shutter spectacles.

The drawings and the detailed description described above are examples for the present invention and are provided to explain the present invention, but the scope of the present invention described in the claims is not limited thereto. Therefore, it will be appreciated to those skilled in the art that various modifications may be made and other equivalent embodiments are available. Accordingly, the actual scope of the present invention must be determined by the spirit of the appended claims.

DESCRIPTION OF SYMBOLS

100: signal controller
200: scan driver
300: data driver
400: display unit
20: shutter spectacles
21: first shutter
22: second shutter
25: shutter driver
30: stereoscopic image display device

What is claimed is:

1. A stereoscopic image display device, comprising:
a display including a plurality of pixels; and
a data driver to supply first image data for a first view point to the plurality of pixels, second image data for a second view point to the plurality of pixels after supply of the first image data, third image data for the second view point to the plurality of pixels after supply of the second image data, and fourth image data for the first view point to the plurality of pixels after supply of the third image data, wherein:
the first and second image data correspond to a first frame,
the third and fourth image data correspond to a second frame,
the second image data for the first frame is directly followed by the third image data for the second frame, and black data is inserted between the first image data and the second image data.

2. The stereoscopic image display device of claim 1, wherein the data driver supplies black data to the plurality of pixels after supply of the first image data and before supply of the second image data.

3. The stereoscopic image display device of claim 2, wherein the data driver supplies black data to the plurality of pixels after supply of the third image data and before supply of the fourth image data.

4. The stereoscopic image display device of claim 3, wherein:
the first stereoscopic image of one frame is displayed according to the first image data and the second image data, and
the second stereoscopic image of one frame following the first stereoscopic image is displayed according to the third image data and the fourth image data.

5. The stereoscopic image display device of claim 3, wherein:
the plurality of pixels are arranged in a matrix format of the display, and
the first image data, the black data, the second image data, the third image data, the black data, and the fourth image data are sequentially supplied to the plurality of pixels.

6. A method for driving a stereoscopic image display device, comprising:
displaying a first image for a first view point on a display;
displaying a second image for a second view point on the display after displaying the first image;
displaying a third image for the second view point on the display after displaying the second image; and
displaying a fourth image for the first view point on the display after displaying the third image, wherein:
the first and second image data correspond to a first frame,
the third and fourth image data correspond to a second frame,
the second image data for the first frame is directly followed by the third image data for the second frame, and black data is inserted between the first image data and the second image data.

7. The method of claim 6, wherein:
the display includes a plurality of pixels arranged in a matrix format, and
displaying images includes supplying corresponding image data to the display of the image sequentially to the plurality of pixels.

8. The method of claim 7, further comprising:
supplying black data to the plurality of pixels after supplying image data for display of the first image to the plurality of pixels and before supplying second image data for display of the second image to the plurality of pixels.

9. The method of claim 8, further comprising:
supplying black data to the plurality of pixels after supplying third image data for display of the third image to the plurality of pixels and before supplying fourth image data for display of the fourth image to the plurality of pixels.

10. A data driving apparatus driving a display including a plurality of pixels, comprising:
a first data driver to supply first image data for a first view point to the plurality of pixels and to supply second image data for the first view point after supply of the first image data; and
a second data driver to supply third image data for a second view point to the plurality of pixels after supply of the second image data and to supply fourth image data for the second view point after supply of the third image data, wherein:
the first image data corresponds to a first frame,
the second and third image data correspond to a second frame,
the fourth image data corresponds to a third frame,
the first image data is directly followed by the second image data,
the third image data is adjacent the fourth image data, and black data is inserted between the second image data and the third image data.

11. The data driving apparatus of claim 10, further comprising:

a black data driver to output black data to the plurality of pixels after the second image data is output and before the third image data is output.

12. The data driving apparatus of claim 11, wherein second image data and third image data separated by the black data are image data to display one frame of the stereoscopic image.

* * * * *